Sept. 22, 1953         H. W. BABCOCK                2,653,274
              CATHODE-RAY DEFLECTION CIRCUIT
Filed Sept. 6, 1945                         2 Sheets-Sheet 1
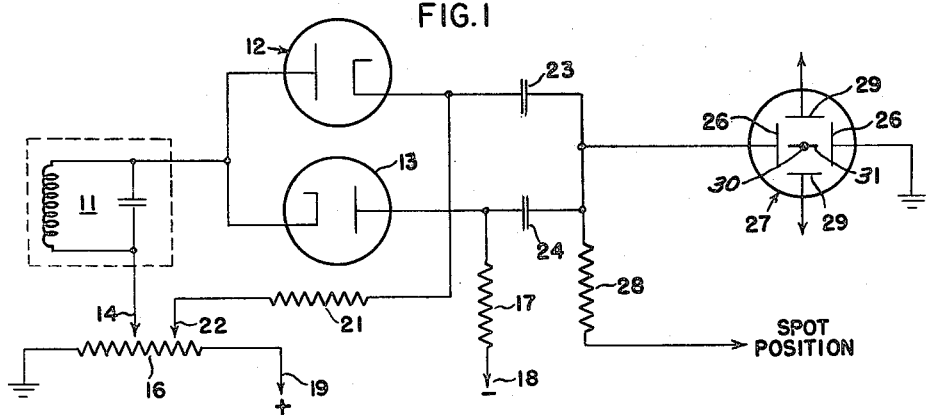
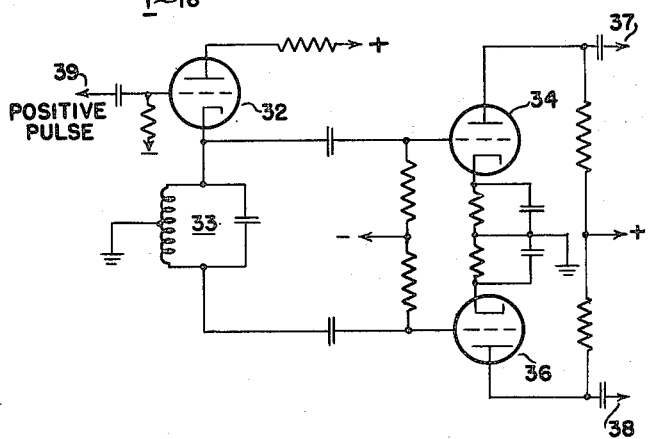
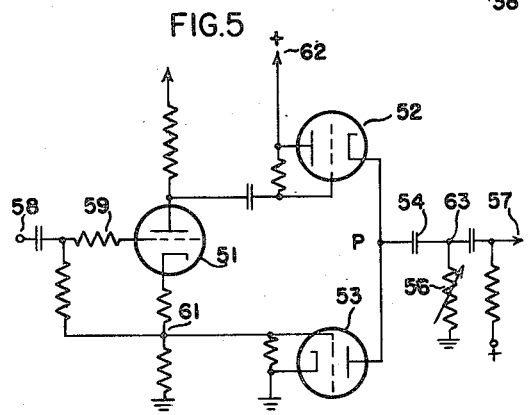
INVENTOR
HORACE W. BABCOCK
BY
ATTORNEY Sept. 22, 1953        H. W. BABCOCK        2,653,274
CATHODE-RAY DEFLECTION CIRCUIT
Filed Sept. 6, 1945                                    2 Sheets-Sheet 2
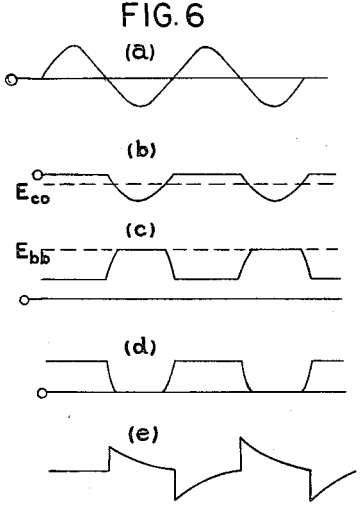
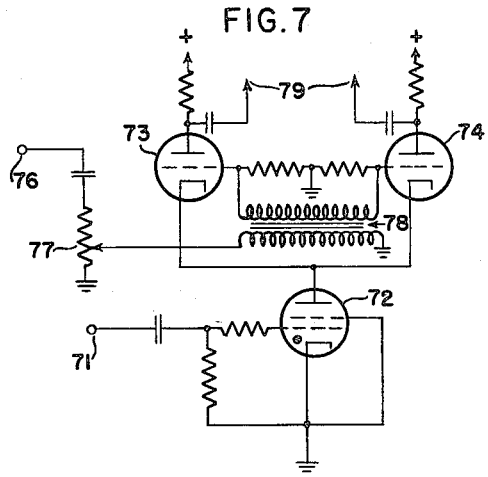
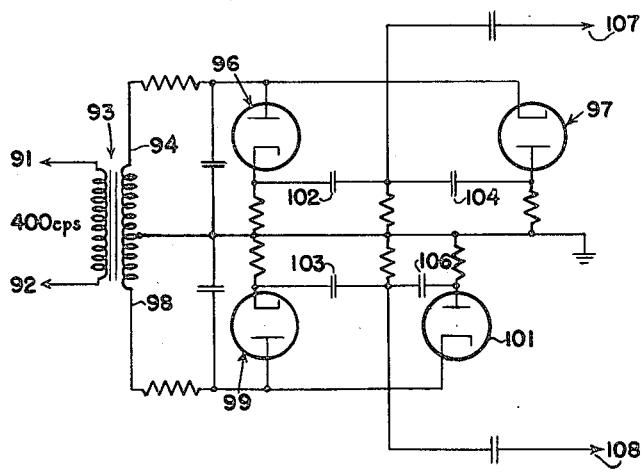
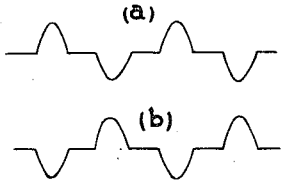
INVENTOR
HORACE W. BABCOCK
BY
*William D. Hall*
ATTORNEY Patented Sept. 22, 1953

2,653,274

UNITED STATES PATENT OFFICE 2,653,274

CATHODE-RAY DEFLECTION CIRCUIT

Horace W. Babcock, Pasadena, Calif., assignor, by mesne assignments, to the United States of America as represented by the Secretary of War Application September 6, 1945, Serial No. 614,729

1 Claim. (Cl. 315—26)

This invention relates generally to electrical circuits, and more particularly to circuits for producing certain specified deflections of the electron beam in a cathode ray tube.

Some types of radio object detection systems which are carried in aircraft are equipped with cathode ray tube indicators in which targets, such as other aircraft, are represented as bright spots on the cathode ray tube screen. In the usual case, the location of the bright spots with reference to a horizontal scale is made to be a measure of the azimuthal position of said targets relative to said aircraft, and the location of the spots with reference to a vertical scale is a measure of the elevational position of said targets with respect to the aircraft.

It may also be desirable to furnish the pilot with information as to the range of the target aircraft, so that he may fire at the target when the correct range is reached. It is an object of this invention to present this information by causing a pair of short bright horizontal line segments to be formed adjacent to and connected with each target spot, in such a way that the length of the line segments is approximately inversely proportional to the target range.

The addition of such lines to the spot provides the pilot with a more realistic picture of the targets confronting him, in that the bright line segments resemble the wings and the central bright spot the fuselage of an aircraft seen from dead ahead or dead astern. The bright line segments will be referred to hereinafter as wings.

One object of this invention is to provide circuits to produce a deflecting voltage capable of adding wings to a spot on an indicator tube.

Other objects, features, and advantages of this invention will suggest themselves to those skilled in the art and will become apparent from the following detailed description when taken in connection with the accompanying drawings, in which:

Fig. 1 is a schematic wiring diagram of a circuit embodying the principles of this invention;

Fig. 2 is a schematic wiring diagram of an alternative form of this invention;

Figs. 3 and 4 are graphical representations of certain wave forms used to explain the operation of the circuit of Fig 2;

Fig. 5 is a wiring diagram of a second alternative form of this invention;

Fig. 6 represents a series of wave forms used in explaining the circuit of Fig. 5;

Fig. 7 is a schematic wiring diagram of a third alternative form of this invention;

Fig. 8 is a schematic wiring diagram of a fourth alternative form of this invention; and Fig. 9 represents certain voltage wave forms used in explaining the circuit of Fig. 8.

Referring now more particularly to Fig. 1, resonant circuit 11 is the tank circuit of a vacuum tube oscillator, which may be any one of many types well known in the art. One side of resonant circuit 11 is connected to the plate and cathode, respectively of diodes 12 and 13, and the other side is connected to movable tap 14 of potentiometer 16. The plate of diode 13 is connected through resistor 17 to a negative source of potential at terminal 18. Potentiometer 16 is connected to ground at the end nearer movable tap 14, and to a positive source of potential at terminal 19. The cathode of diode 12 is connected through resistor 21 to tap 22 of potentiometer 16. The cathode of diode 12 and the plate of diode 13 are also connected respectively through condensers 23 and 24 to one of the horizontal deflecting plates 26—26 of cathode ray tube indicator 27, the other horizontal deflecting plate being grounded.

Cathode ray tube 27 is the indicating portion of the associated radio object detection apparatus. A voltage to deflect the electron beam horizontally in accordance with the azimuthal location of the targets is supplied from said apparatus through resistor 28. A voltage for deflecting the electron beam vertically in accordance with the relative elevation of the targets is supplied to vertical deflection plates 29 from said apparatus.

It will be obvious to those skilled in the art that diodes 12 and 13 will conduct on alternate half-cycles of the voltage output from circuit 11. It will also be obvious that the portion of each half-cycle during which each tube will conduct is determined by the values of bias voltage impressed at terminals 18 and 19; that is, the larger these bias potentials, the shorter the conducting periods and the smaller the positive and negative pulses applied to deflecting plates 26.

The bias potentials are supplied to terminals 18 and 19 from the associated radio object detection apparatus, and are made to vary in accordance with the range of the targets by said apparatus. Potentiometer 16 is included for purposes of calibrating and equilizing the wing lengths. It will be apparent that the periods of sustained voltage will produce a bright spot at the proper position on the cathode ray tube screen as indicated by reference numeral 30 and that the variable and intermittent voltage will produce fainter traces or wings 31 of appropriate length to symbolize the range of the object.

Referring now more particularly to Figs. 2, 3, and 4 for a detailed explanation of an alternate form of this invention, tube 32 is connected at the cathode to oscillatory circuit 33, a central point of which is grounded. The ends of oscillatory circuit 33 are coupled to tubes 34 and 36, which are connected as overdriven amplifiers, their plates being coupled to the horizontal deflection plates of the cathode ray tube indicator, at terminals 37 and 38.

A series of short positive pulses is fed to the circuit at terminal 39. Each of these pulses occurs simultaneously with the transmission by the associated radio object detection apparatus, of a pulse of radio frequency energy. Tube 32 is biased to plate-current cutoff, and is rendered conductive for brief periods during each input pulse. These brief periods of conduction in tube 32 shock oscillatory circuit 33 into oscillation.

Tubes 34 and 36 are also biased to plate-current cutoff so that they conduct only on alternate peaks of the sinusoidal voltage from tank circuit 33, and produce wave forms of plate voltage approximately as represented in Figs. 3a and 3b respectively. These output voltages are connected through terminals 37 and 38 to the horizontal deflecting plates of the cathode ray tube indicator. As will be obvious to those skilled in the art, the application of the negative pulses alternately to the right- and left-hand deflecting plates causes alternate right and left deflection of the electron beam. However, the electron beam does not produce a visible trace except at specified times, as will be explained.

It will also be obvious to those skilled in the art that the amplitude of the oscillations in tank 33 will decay in an exponential manner as shown in Fig. 4b during the intervals between the pulses applied at terminal 31, shown in Fig. 4a. Each echo pulse shown in Fig. 4c, returning at a time proportional to the target range after the transmitted pulse, is caused to intensify the electron beam of the indicator tube during the small interval between the dashed lines in Figs. 4b and 4c, so that the visible wings produced have a length which depends upon the amplitude of the oscillations in tank 33 during reception of an echo pulse. The wing length therefore varies in an inverse relationship to the range to the target. It will be further obvious to those skilled in the art that this inverse relationship is not a proportionality, but is a reasonable approximation thereto at medium to long ranges.

Referring now more particularly to Figs. 5 and 6 for a detailed explanation of a second alternate form of this invention, tube 51 is connected as an overdriven paraphase amplifier, connected at the plate to tube 52 and at the cathode to tube 53. The cathode of tube 52 and the plate of tube 53 are connected together to one side of condenser 54, the other side of which is connected to ground through variable resistor 56, and coupled to the horizontal deflection plates of the cathode ray tube indicator at terminal 57.

A sinusoidal wave of voltage is introduced at input terminal 58, the wave form being illustrated in Fig. 6a. Because of the grid-limiting effect of resistor 59, the positive peaks of voltage applied to the grid of tube 51 are cut off, so that the wave form at said grid is as shown in Fig. 6b. The amplitude of the voltage applied to said grid is sufficient to drive tube 51 below plate-current cutoff, indicated by the dashed line in Fig. 6b, so that the wave form of plate voltage in tube 51 is substantially rectangular, as shown in Fig. 6c. The wave form of voltage thus generated at junction 61 is also rectangular and 180° out of phase with the plate voltage, as indicated in Fig. 6d.

The amplitudes of the voltages at the plate of tube 51 and at junction 61 are sufficiently great to drive tubes 56 and 57 respectively, alternately to plate-current cutoff and to conduction with a relatively low internal impedance. Hence tubes 52 and 53 may be regarded as switches which are alternately and successively closed and opened. When tube 52 is conducting, tube 53 is cut off, and condenser 54 is allowed to charge to approximately the potential at terminal 62, the charging current flowing through resistor 56. When tube 52 is cut off, tube 53 is made to conduct, so that condenser 54 discharges approximately to zero voltage, the discharge current flowing through resistor 56.

It will be obvious to those skilled in the art that the voltage at junction 63 will be a succession of positive and negative pulses, each decaying in an exponential manner, as shown in Fig. 6e. The rate of the exponential decay and the initial magnitude of each pulse will be approximately inversely proportional to the value of the resistor 56. The value of resistor 56 is therefore controlled by the associated radio echo detection apparatus in accordance with the range of targets being observed. The pulses at junction 63 are transmitted to the horizontal deflection plates of the cathode ray tube indicator as previously described, and herefore produce wings on the target spot as desired.

Referring now more particularly to Fig. 7 for a detailed description of a third alternate form of this invention, tube 72 is connected in the common cathode circuit of tubes 73 and 74, which are connected as a conventional push-pull amplifier. A sinusoidal voltage of approximately 40 cycles per second is applied through terminal 71 to the control grid of gas tetrode 72. Gas tetrode 72 operates in a manner that is well known in the art, wherein the grid is able to control the start of conduction of the tube, but thereafter loses all control until conduction is stopped by virtue of the plate voltage becoming zero. Hence, tube 72 acts as a switch which is closed during the positive half-cycles of the input voltage, and open during the negative half-cycles.

A sinusoidal voltage of approximately 400 cycles per second is introduced at terminal 76, and excites the grids of tubes 73 and 74 through transformer 78. During the periods of conduction of tube 72, tubes 73 and 74 are allowed to operate as a conventional push-pull amplifier, to produce an alternating output voltage at terminals 79. The magnitude of the output voltage is controlled by potentiometer 77, which is adjusted in accordance with the range of targets being observed by the associated radio object detection apparatus.

The output voltage from terminals 79 is applied to the horizontal deflection plates of the said detection apparatus to produce wings on the target spots thereon displayed. During the periods of non-conduction of tube 72, no wings are produced and the undeflected spot on the cathode ray tube indicator represents the fuselage of the aircraft.

Referring now more particularly to Fig. 8 for a detailed explanation of a fourth alternate form of this invention, diodes 96 and 97 have their plate and cathode, respectively, connected to one end of the secondary winding of transformer 93, and diodes 99 and 101 have their respective plate and cathode connected to the other end of the secondary. The remaining electrodes of each diode 96, 97, 99, and 101 are individually connected through resistors to ground, and are coupled by pairs through condensers 102, 103, 104, and 105 to two output junctions which are coupled to the horizontal deflection plates of the cathode ray tube indicator at terminals 107 and 108.

An alternating voltage is fed from the associated radio object detection apparatus to terminals 91 and 92 to energize the primary winding of transformer 93. Secondary terminal 94 is connected to plate and cathode respectively of diodes 96 and 97, and secondary terminal 98 is connected to plate and cathode respectively of diodes 99 and 101.

It will be obvious to those skilled in the art that diodes 96 and 101 will conduct on positive half-cycles of input voltage, while diodes 97 and 99 will conduct on negative half-cycles. Condensers 102 and 103 thus acquire charges which bias positively the cathodes to which they are connected, while condensers 104 and 105 acquire charges which bias negatively the plates to which they connect. Each diode therefore conducts only during the period that its plate-to-cathode potential exceeds the bias voltage, which period is substantially less than a half-cycle of input voltage.

The output wave forms of voltage at terminals 107 and 108 are therefore approximately as shown in Figs. 9a and 9b, respectively, and are fed to the horizontal deflection plates of the cathode ray tube indicator to form a spot with wings. The input voltage at terminals 91 and 92 from the associated radio object detection apparatus is made to vary in amplitude approximately inversely proportional to the range to the target being represented, so that the length of the wings produced bears the desired relationship to range.

While there have been described what are at present considered to be the preferred embodiments of this invention, it will be obvious to those skilled in the art that various changes and modifications may be made therein without departing from the scope of the invention as set forth in the appended claim.

The invention claimed is:

An electrical circuit comprising a first electron discharge device, a second electron discharge device, a third electron discharge device, an oscillatory circuit comprising an inductance and a capacitance, an anode of said first electron discharge device being adapted to be connected to a positive source of direct potential, a control electrode of said first electron discharge device being adapted to be connected to a source of positive voltage pulses, a cathode of said first electron discharge device being connected to one side of said oscillatory circuit, an intermediate point of said oscillatory circuit being connected to ground; means for transmitting the voltage variations at one side of said oscillatory circuit to a control electrode of said second electron discharge device, means for transmitting the voltage variations at the other side of said oscillatory circuit to a control electrode of said third electron discharge device, means for maintaining negative bias voltages on said second and third electron discharge devices, means adapted to transmit the voltage variations at the anodes of said second and third electron discharge devices to the electron beam deflecting means of a cathode ray tube.

HORACE W. BABCOCK.

References Cited in the file of this patent

UNITED STATES PATENTS

| Number | Name | Date |
|---|---|---|
| 2,153,202 | Nichols | Apr. 4, 1939 |
| 2,180,365 | Norton | Nov. 21, 1939 |
| 2,225,469 | Diebold | Dec. 17, 1940 |
| 2,231,591 | Pieplow | Feb. 11, 1941 |
| 2,258,752 | Fewings et al. | Oct. 14, 1941 |
| 2,271,876 | Seeley | Feb. 3, 1942 |
| 2,278,641 | Bond | Apr. 7, 1942 |
| 2,328,248 | Andrieu | Aug. 31, 1943 |
| 2,416,290 | Depp | Feb. 25, 1947 |
| 2,416,591 | Muntz et al. | Feb. 25, 1947 |
| 2,427,905 | Fyler | Sept. 23, 1947 |
| 2,432,330 | Norgaard | Dec. 9, 1947 |
| 2,433,758 | Hershberger | Dec. 30, 1947 |
| 2,436,655 | Locke | Feb. 24, 1948 |